US010521607B2

(12) United States Patent
Agrawal et al.

(10) Patent No.: US 10,521,607 B2
(45) Date of Patent: Dec. 31, 2019

(54) CONTEXTUAL CONTENT SHARING IN A VIDEO CONFERENCE

(71) Applicant: MOTOROLA MOBILITY LLC, Chicago, IL (US)

(72) Inventors: Amit Kumar Agrawal, Bangalore (IN); Jyothsna Bandameedipalli, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 79 days.

(21) Appl. No.: 15/696,397

(22) Filed: Sep. 6, 2017

(65) Prior Publication Data
US 2019/0073490 A1    Mar. 7, 2019

(51) Int. Cl.
| | |
|---|---|
| G06F 21/62 | (2013.01) |
| H04L 29/06 | (2006.01) |
| G06F 3/14 | (2006.01) |
| H04N 7/14 | (2006.01) |
| H04N 7/15 | (2006.01) |

(52) U.S. Cl.
CPC ........ *G06F 21/6254* (2013.01); *G06F 3/1454* (2013.01); *G06F 21/6263* (2013.01); *H04L 63/102* (2013.01); *H04L 63/104* (2013.01); *H04N 7/147* (2013.01); *H04N 7/15* (2013.01)

(58) Field of Classification Search
CPC . G06F 21/6254; G06F 3/1454; H04L 63/102; H04N 7/15
See application file for complete search history.

(56) References Cited

U.S. PATENT DOCUMENTS

| | | | |
|---|---|---|---|
| 7,363,589 B1 * | 4/2008 | Maeng ................. | G06Q 10/10 715/719 |
| 2010/0077481 A1 * | 3/2010 | Polyakov ............. | G06F 21/552 726/24 |

(Continued)

OTHER PUBLICATIONS

Tolone, William et al., "Access Control in Collaborative Systems", ACM Computing Surveys, vol. 37, No. 1, Mar. 2005.

(Continued)

*Primary Examiner* — Abu S Sholeman
(74) *Attorney, Agent, or Firm* — Yudell Isidore PLLC

(57) ABSTRACT

A method, a system, and a computer program product for contextually sharing content with at least one receiving participant during a video conference. The method includes identifying content to be shared by a sharing participant within a shared space of the video conference that is viewable by the at least one receiving participant. The method further includes determining at least one sharing parameter that defines participant access to view the content and determining sharing credentials for each receiving participant of the video conference. The method further includes comparing the at least one sharing parameter to the sharing credentials of each receiving participant to individually determine which receiving participants are authorized to view the content. The method further includes, in response to the comparison indicating that a receiving participant is not authorized to view the content, omitting or rendering the content unreadable within the shared space for the unauthorized receiving participant.

18 Claims, 8 Drawing Sheets

(56) References Cited

U.S. PATENT DOCUMENTS

| | | | |
|---|---|---|---|
| 2014/0025767 A1* | 1/2014 | De Kezel | G06Q 10/107 |
| | | | 709/206 |
| 2014/0104372 A1* | 4/2014 | Calman | H04N 7/155 |
| | | | 348/14.08 |
| 2015/0139210 A1* | 5/2015 | Marin | H04W 48/16 |
| | | | 370/338 |
| 2017/0339216 A1* | 11/2017 | Carlos | H04L 67/10 |

OTHER PUBLICATIONS

Berry, Lior, "Role-Based Control of Shared Application Views", University of British Columbia, Aug. 19, 2005.

\* cited by examiner

CONTEXTUAL CONTENT SHARING IN A VIDEO CONFERENCE

BACKGROUND

1. Technical Field

The present disclosure generally relates to electronic devices having video conferencing capabilities and in particular to a method for contextually sharing information during a video conference.

2. Description of the Related Art

Many modern personal devices, such as notebook computers and cellular phones, are utilized to participate in video conferences with other remote participants. During a typical video conference, a participant may choose to share on-screen content, such as a desktop view or an open application window. However, users sharing on-screen content may inadvertently reveal information that is personal or confidential. For example, a user may unintentionally share personal email or sensitive confidential/internal enterprise documents that are viewable on the user's shared screen.

Existing solutions share the user's screen identically with all participants in the video conference. However, some participants in the video conference may not have authorization to view some of the shared content. The sharing user may further be unaware of particular access privileges of individual participants in the conference or that some visible content contains personal and/or confidential information. Additionally, a user may also unknowingly open additionally personal or confidential content during a video conference that select participants should not have authorization to view.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
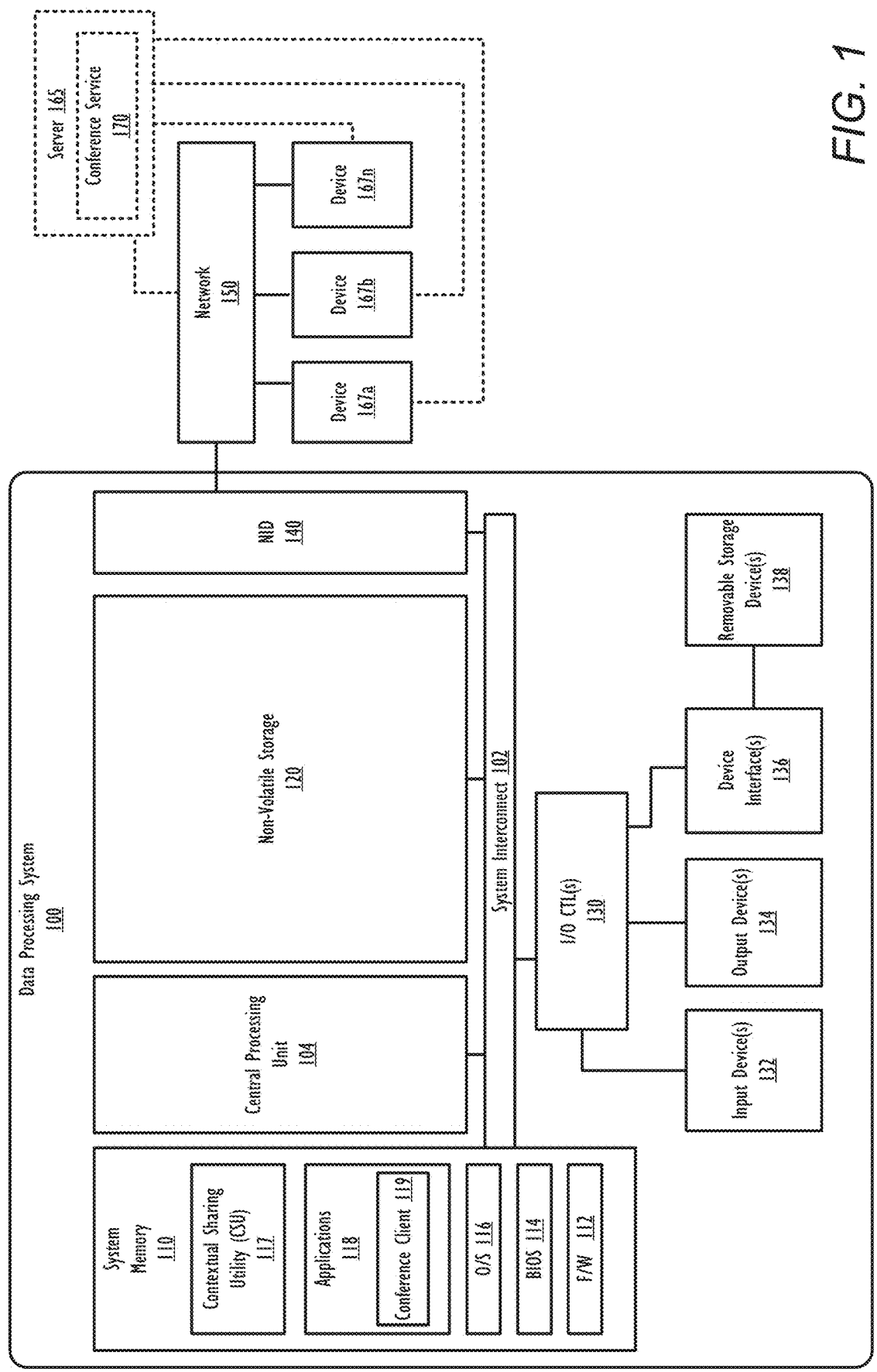
FIG. 1 illustrates a data processing system within which certain aspects of the disclosure can be practiced, in accordance with one or more embodiments.

The illustrative embodiments provide a method, a system, and a computer program product for contextually sharing content with at least one receiving participant during a video conference. The method includes identifying content to be shared by a sharing participant within a shared space of the video conference, the shared space being viewable by the at least one receiving participant. The method further includes determining at least one sharing parameter that defines participant access to view the content and determining sharing credentials for each receiving participant of the video conference. The method further includes comparing the at least one sharing parameter to the sharing credentials of each receiving participant to individually determine which receiving participant is authorized to view the content. The method further includes, in response to the comparison indicating that a receiving participant is not authorized to view the content, obfuscating the content within the shared space for the unauthorized receiving participant.

The above description contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within data processing system 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted a block diagram representation of an example data processing system (DPS) 100, within which one or more of the described features of the various embodiments of the disclosure can be implemented. In at least one embodiment, DPS 100 can be any electronic device and/or data processing system such as, but not limited to, a desktop computer, notebook computer, mobile phone, smart watch, or tablet.

DPS 100 includes at least one processor or central processing unit (CPU) 104 coupled to system memory 110 and non-volatile storage 120 via system interconnect 102. System interconnect 102 can be interchangeably referred to as a system bus, in one or more embodiments. One or more software and/or firmware modules can be loaded into system memory 110 during operation of DPS 100. Specifically, in at least one embodiment, system memory 110 can include therein a plurality of such modules, including one or more of firmware (F/W) 112, basic input/output system (BIOS) 114, operating system (OS) 116, contextual sharing utility (CSU) 117, and application(s) 118. These software and/or firmware modules provide varying functionality when their corresponding program code is executed by CPU 104 or by secondary processing devices within DPS 100. In at least one embodiment, application(s) 118 may include conference client (CC) 119, which is configured to facilitate video conferences with at least one receiving participant, including but not limited to, receiving participants associated with devices 167a-n, server 165, and any other devices connected to network 150. In at least one embodiment, a receiving participant is a person having a profile and/or video conferencing account that is associated with one, or accessed on, one of devices 167a-n. In another embodiment, each receiving participant is one of devices 167a-n and each of devices 167a-n is associated with a particular user. In at least one embodiment, CC 119 may be used to establish a video conference between DPS 100 with at least one remote and/or cloud-based conferencing service, such as conference service 170 of server 165.

DPS 100 executes CSU 117 to perform the various methods and functions described herein. In one or more embodiments, CSU 117 may be used to contextually share, via network 150, content within a shared space of a video conference. According to one aspect of the disclosure, and as illustrated by FIGS. 3-8, which are described later, a video conference involves a sharing participant (e.g., DPS 100) and at least one receiving participant (e.g., devices 167a-n). In at least one embodiment, the video conference is a peer-to-peer video conference between the sharing participant and at least one receiving participant. In another embodiment, conference service 170 may operate as an intermediary device to facilitate sharing of video content/data between the sharing participant and the at least one receiving participant. It should also be noted that, in one or more embodiments, the video conference may include more than one sharing participant. For simplicity, CSU 117 is illustrated and described as a stand-alone or separate software/firmware/logic component, which provides the specific functions and methods described herein. However, in at least one embodiment, CSU 117 may be a component of, may be combined with, or may be incorporated within firmware of DPS 100, or within OS 116, and/or within one or more of applications 118, particularly CC 119. In another embodiment, CSU 117 may be a plugin module that integrates within at least one of CC 119, an internet browser provided as one or more application(s) 118, and/or at least one network protocol layer (not pictured) of DPS 100.

DPS 100 further includes one or more input/output (I/O) controllers 130, which support connection by and processing of signals from one or more connected input device(s) 132, such as a keyboard, mouse, hardware button(s), touch screen, infrared (IR) sensor, fingerprint scanner, or microphone. I/O controllers 130 also support connection with and forwarding of output signals to one or more connected output devices 134, such as monitors/displays and audio speaker(s). Additionally, in one or more embodiments, one or more device interfaces 136, such as an optical reader, a universal serial bus (USB), a card reader, Personal Computer Memory Card International Association (PCMIA) slot, and/ or a high-definition multimedia interface (HDMI), can be associated with DPS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interfaces 136 can further include General Purpose I/O interfaces, such as an Inter-Integrated Circuit ($I^2C$) Bus, System Management Bus (SMBus), and peripheral component interconnect (PCI) buses.

DPS 100 further includes a network interface device (NID) 140 that enables DPS 100 and/or components within DPS 100 to communicate and/or interface with other devices, services, and components that are located external to DPS 100. In at least one embodiment, DPS 100 may directly connect to one or more of these external devices, such as server 165 and devices 167a-n, via network 150. Network 150 can be a local area network, wide area network, personal area network, and the like, and the connection to and/or between network 150 and NID 140 can be wired or wireless or a combination thereof. NID 140 may include at least one wireline NID for physically connecting to external devices via network 150. NID 140 may also include at least one wireless NID that DPS 100 may utilize to connect, via a wireless connection, to devices 167a-n and/or server 165 via network 150. In one or more embodiments, devices 167a-n represent receiving participants, as described in greater detail below. For purposes of discussion, network 150 is indicated as a single collective component for simplicity. However, it is appreciated that network 150 can comprise one or more direct connections to other devices as well as a more complex set of interconnections as can exist within a wide area network, such as the Internet. In one or more embodiments, DPS 100 may operate as a wireless communication device and NID 140 may be used to transmit data over a wireless network (e.g., a Wireless Fidelity (Wi-Fi) network, cellular network, Bluetooth® network (including Bluetooth® low energy (BLE) networks), a wireless ad hoc network (WANET), or personal area network (PAN)).

Figure 2:
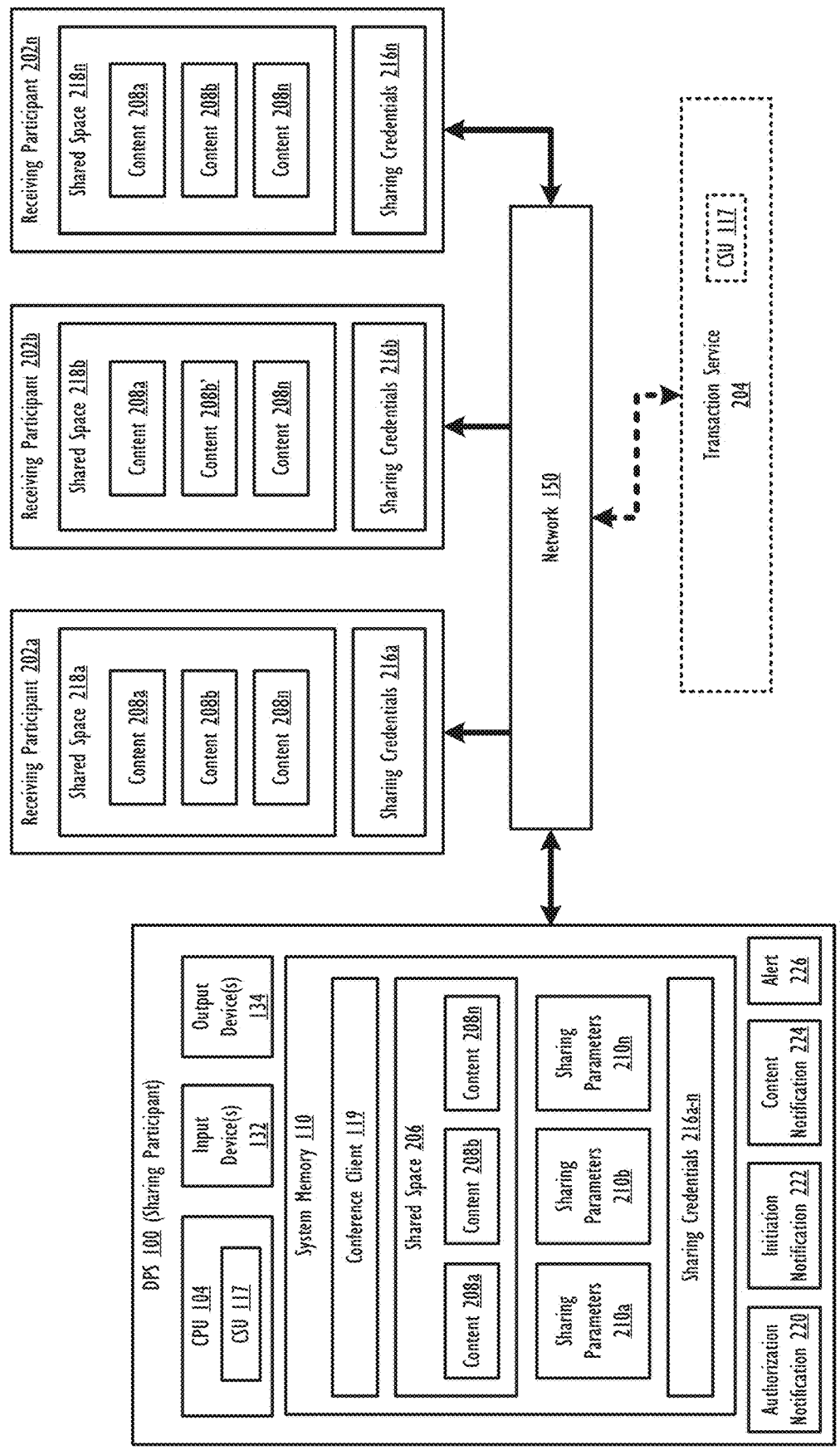
FIG. 2 illustrates an example data processing system configured to contextually share content with at least one receiving participant during a video conference, in accordance with one or more embodiments.

FIG. 2 is a block diagram illustrating additional functional components within example data processing system 100, which is configured to contextually share content with at least one receiving participant during a video conference, in accordance with one or more embodiments of the present disclosure. As illustrated, DPS 100 includes CPU 104, which executes CSU 117. DPS 100 also includes input device(s) 132, output device(s) 134, and system memory 110, which includes: conference client 119, shared space 206, and sharing parameters 210a-n. In at least one embodiment, DPS 100 directly communicates with receiving participants 202a-n via network 150. For example, DPS 100 may conduct a peer-to-peer video conference with receiving participants 202a-n over network 150. In another embodiment, DPS 100 and receiving participants 202a-n communicate with transaction service 204 over network 150. In this embodiment, transaction service 204 includes a processor for executing CSU 117, or portions thereof. For example, transaction service 204 may function as an intermediary device that receives sharing space 206 and/or content 208a-n from DPS 100 and contextually shares content 208a-n with receiving participants 202a-n.

CPU 104 detects when a video conference is to be conducted with at least one receiving participant 202. For example, CPU 104 may detect when a user of DPS 100 has initiated, via input device 132, a video conference with receiving participants 202a-n. In response to detecting initiation of the video conference, CPU 104 identifies shared space 206 and content 208a-n, which is to be shared with receiving participants 202a-n within shared space 206 during the video conference. Shared space 206 is a viewable area of content 208a-n that is viewable by receiving participants 202a-n during the video conference. Shared space 206 can include, but is not limited to, a desktop view of DPS 100 (or a sub-portion thereof) or a program interface/window of at least one application (e.g., application 118) executing on DPS 100. Content 208a-n can include, but is not limited to, a program interface/window of an application, or a sub-portion thereof. For example, shared space 206 may be a desktop interface that contains one or more of: first content 208a (an email client window containing an internal enterprise message), second content 208b (a multimedia presentation containing classified content), and third content 208n (a browser window displaying a personalized view of a social media website). In another embodiment, shared space 206 includes only specific content selected by a user during initiation of the video conference. For example, shared space 206 may include only a browser window (e.g., content 208n) specifically selected by a user of DPS 100 via input device 132.

In response to identifying content 208a-n that is included in shared space 206, CPU 104 determines sharing parameters 210a-n for each content 208a-n. As illustrated, first sharing parameters 210a are associated with first content 208a, second sharing parameters 210b are associated with second content 208b, and third sharing parameters 210n are associated with third content 208n. Sharing parameters 210a-n define which participant has access to view a corresponding content and, where applicable, a level/type of participant access. In at least one embodiment, sharing parameters 210a-n describe specific entities (e.g., users, organizational levels/groups, companies) that are authorized to view a particular content. For example, sharing parameters 210a-n may include the names or online identifiers of specific persons who are authorized to view the content. In another embodiment, CPU 104 may determine a hierarchy within an organizational group. For example, within a company an organizational hierarchy that establishes pay grades (e.g., GS 13 or GS 14) and/or position levels (e.g., staff, administrative, management, corporate) may be defined. In this embodiment, sharing parameters 210a-n may define that any persons at and/or above a particular level in the hierarchy (e.g., position, job title, or pay grade) are authorized to view a corresponding content. In another embodiment, sharing parameters 210a-n define a classification of a content. For example, sharing parameters 210a-n can describe at least one specific classification of the content, such as: confidential, restricted, top-secret, internal use only, open, and/or public knowledge. In another embodiment, sharing parameters 210a-n can describe a classification of a corresponding content that is associated with an identity and/or organizational affiliation of the sharing participant. In another embodiment, sharing parameters 210a-n can describe a source of a corresponding content (which may include a particular media, device, system, and/or a filesystem location where the content is stored). In another embodiment, sharing parameters 210a-n can describe an event listing corresponding to the video conference (e.g., a calendar event) that identifies one or more attendees. In still another embodiment, sharing parameters 210a-n can describe an organizational policy.

In at least one embodiment, CPU 104 determines sharing parameters 210a-n for a particular content by reading metadata associated with the content. In another embodiment, CPU 104 may retrieve sharing parameters 210*a-n* from a filesystem where the content is stored. In another embodiment, CPU 104 may retrieve sharing parameters 210*a-n* from a cloud computing service associated with the content and/or the sharing participant. In another embodiment, if the metadata of a content does not describe sharing parameters 210*a-n* of that content, CPU 104 may analyze the content and extract a classification based on the analysis of the content. For example, CPU 104 may parse the words within the content and identify any references to a particular classification (e.g., confidential or public knowledge) within that content. In another embodiment, CPU 104 may analyze a storage location of the content to determine a classification of the content. For example, if a particular content is stored in a folder that is marked with a particular classification (e.g., for internal use only), CPU 104 may determine the classification of the content (e.g., internal use only) based on the classification of that folder.

In at least one embodiment, classification information that is determined by analyzing the content and/or storage location of the content is stored within metadata of that content. For example, in response to parsing a word-processing file and extracting a classification of "TOP SECRET", the "TOP SECRET" may be stored within metadata of that file. In another embodiment, classification information that is determined by analyzing the content and/or storage location of the content can be additionally, or alternatively, stored in a database (not illustrated) within DPS 100 or a database that is accessible to DPS 100 via network 150.

CPU 104 also determines sharing credentials 216*a-n* for each receiving participant 202*a-n* participating in the video conference. Sharing credentials 216 describe, for a particular receiving participant 202, at least one of: information access permissions (e.g., top-secret clearance), an organizational affiliation (e.g., company), and/or a hierarchical access level (e.g., position, job title, or pay grade). As illustrated, first sharing credentials 216*a* are associated with receiving participant 202*a*, second sharing credentials 216*b* are associated with receiving participant 202*b*, and third sharing credentials 216*n* are associated with receiving participant 202*n*. In at least one embodiment, CPU 104 determines sharing credentials 216*a-n* for each receiving participant 202*a-n* by reading an event description (e.g., calendar event) associated with the video conference. In another embodiment, DPS 100 receive sharing credentials 216 of receiving participant during a connection handshake between DPS 100 and that receiving participant (device) and before the receiving participant is permitted to access shared space 206. In another embodiment, DPS 100 retrieves sharing credentials 216*a-n* from memory 110. In another embodiment, sharing credentials 216 of a receiving participant may be stored in a profile that is associated with a user and/or organization and that is retrieved or accessed by CPU 104 prior to the start of the video conference. In still another embodiment, DPS 100 retrieves sharing credentials 216*a-n* from a server and/or transaction service 204 that is associated with the video conference.

In response to determining sharing credentials 216*a-n* for each receiving participant 202*a-n* of the video conference, CPU 104 compares, for each receiving participant 202*a-n*, the sharing parameters 210*a-n* for each content 208*a-n* to the sharing credentials 216*a-n* to individually determine which receiving participants 202*a-n* are authorized to view each individual content 208*a-n*. Based on the comparison, CPU 104 generates a shared space 218*a-n* to be provided to each receiving participant 202*a-n*. Shared spaces 218*a-n* are customized views of shared space 206 that are intended for consumption by a particular receiving participant 202*a-n*. Shared spaces 218*a-n* provide a view of content 208*a-n* that a corresponding receiving participant 202 is authorized to view and an obfuscated view of content that the corresponding participant is not authorized to view. As illustrated, first shared space 218*a* is associated with receiving participant 202*a*, second shared space 218*b* is associated with receiving participant 202*b*, and third shared space 218*n* is associated with receiving participant 202*n*. Within each of shared spaces 218*a-n*, CPU 104 obfuscates all content that a corresponding receiving participant 202 is not authorized to view whenever that content is being shared within the shared space. For example, if receiving participant 202*b* is authorized to view first content 208*a* and third content 208*n* but is not authorized to view second content 208*b*, then shared space 218*b*, as provided to receiving participant 202*b*, would include content 208*a*, content 208*n*, and content 208*b'*, which is an obfuscated view of content 208*b*. In at least one embodiment, CPU 104 obfuscates unauthorized content for a receiving participant by applying a graphical effect to an area associated with the content. For example, CPU 104 may pixelate, blur, black-out, or white out the unauthorized content. In another embodiment, CPU 104 omits the unauthorized content (e.g., content 208*b*) entirely from a corresponding shared space (e.g., shared space 218*b*). In one or more embodiments, CPU 104 displays a notification message within a shared space 218 of a receiving participant 202 when any content in that shared space is being obfuscated. For example, within shared space 218*b*, CPU 104 may display a notification message that indicates "You are not currently authorized to view this content" within an area associated with content 208*b'*. It should be noted that within a shared space (e.g., shared space 218*b*) of a receiving participant (e.g., receiving participant 202*b*), only the areas within that shared space that are associated with content that the receiving participant is not authorized to view/access are obfuscated. Any content that the participant is authorized to view is presented normally within the shared space. Thus, within shared spaces 218*a-n*, some content may be visible while other content is obfuscated.

Figure 3A:
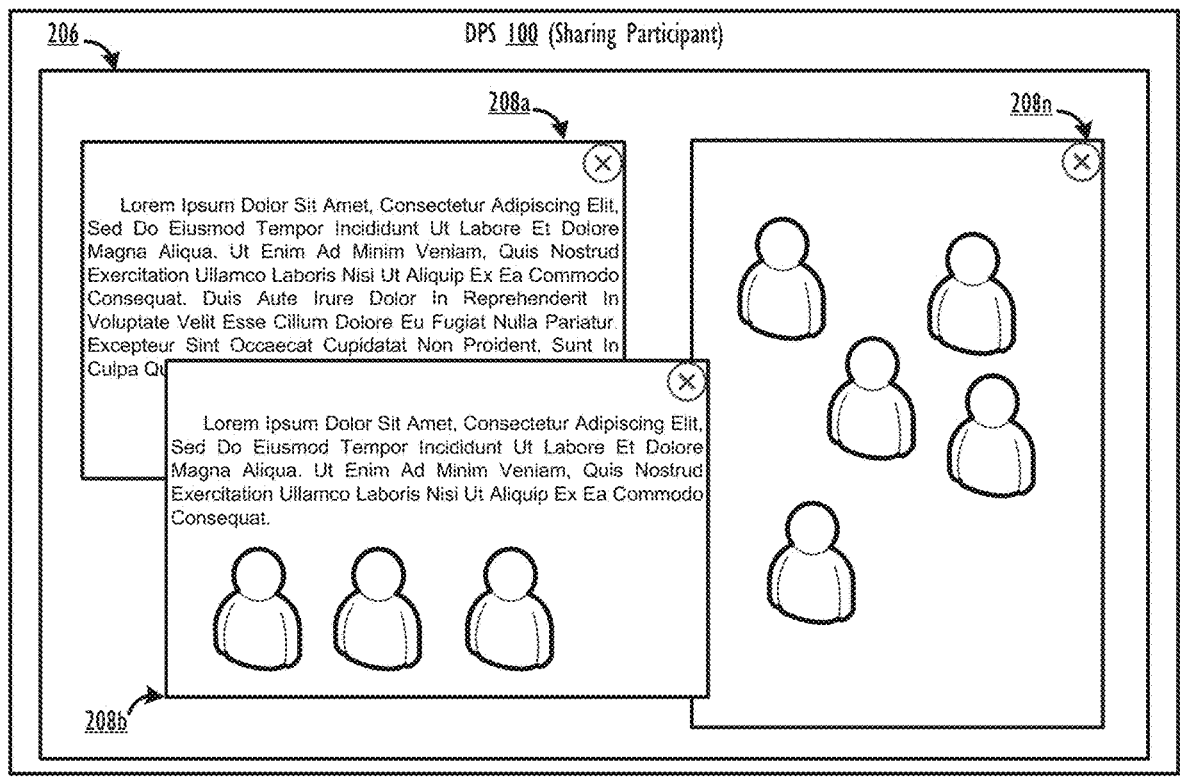
FIG. 3A illustrates an example shared space that may be provided by a sharing participant to at least one receiving participant within a video conference, in accordance with one or more embodiments.
Figure 3B:
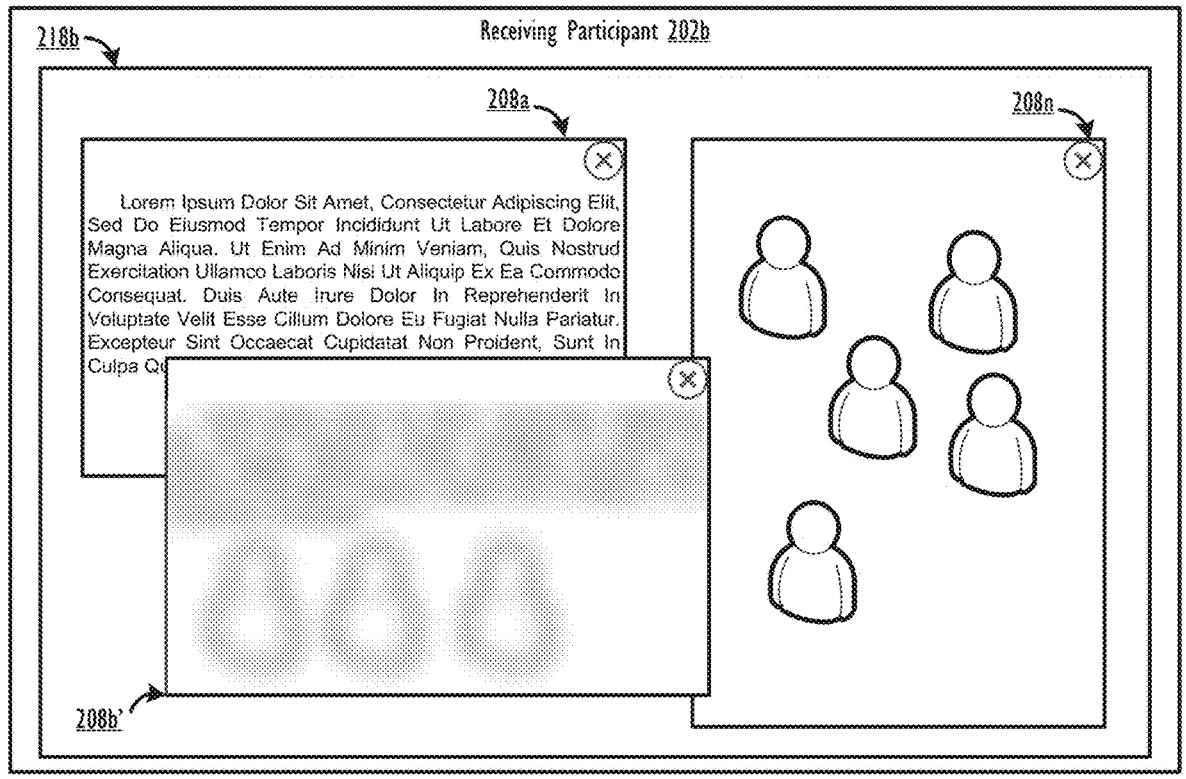
FIG. 3B illustrates an example shared space, including obfuscated content, that may be provided by a sharing participant to at least one receiving participant within a video conference, in accordance with one or more embodiments.

Referring now to FIG. 3A-B, there is illustrated in FIG. 3A an example shared space that is viewable to a user of DPS 100 during a video conference, in accordance with one or more embodiments. FIG. 3A illustrates shared space 206 that is viewable on an output device (e.g., monitor) of DPS 100. In the illustrated example, shared space 206 includes an email client window containing an internal enterprise message (content 208*a*), a multimedia presentation containing classified content (content 208*b*), and a browser window displaying a personalized view of a social media website (content 208*n*). In FIG. 3B there is illustrated an example shared space, including obfuscated content, that may be provided to a particular receiving participant within a video conference based on a comparison of sharing parameters for each content and the sharing credentials for the receiving participant, in accordance with one or more embodiments. In the illustrated example, shared space 206 includes first content 208*a*, third content 208*n*, and obfuscated content 208*b'*, which is an obfuscated (blurred) view of second content 208*b*.

Figure 4:
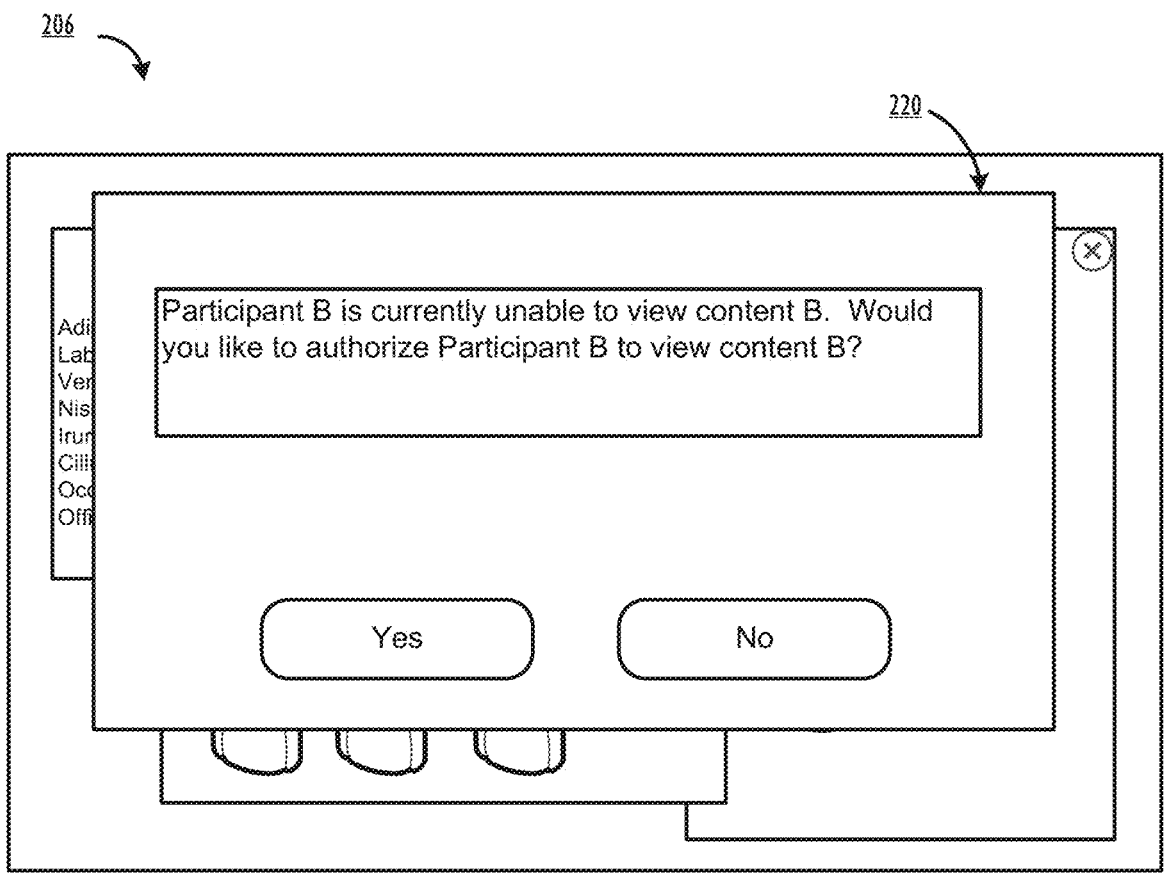
FIG. 4 illustrates an example authorization notification, in accordance with one or more embodiments.

Referring again to FIG. 2, CPU 104 can also determine when receiving participants 202*a-n* include both a first group receiving participants (e.g., receiving participant 202*a* and receiving participant 202*n*) that are authorized to view a particular content (content 208*b*) and a second group of receiving participants (receiving participant 202*b*) that are not authorized to view the particular content, where both groups are connected on the same video conference. In response to determining a first group and a second group of participants exist for a particular content, CPU 104 generates authorization notification 220 which identifies those participants in the second group that are not currently authorized to view a particular content (content 208*b*). According to one embodiment, CPU 104 also provides an option in the authorization notification 220 to allow the sharing party to provide approval and/or to authorize the second group of participants to view the particular content if the sharing participant has the authority to grant permissions to the second group of participants. For example, an organizational policy may establish permissions that determine whether the option to provide approval and/or to authorize the second group of participants is provided within the authorization notification 220 for the sharing participant. CPU 104 may receive a response to authorization notification 220 via an input device (e.g., keyboard, mouse, and/or touch screen display). In one embodiment, in response to determining the received response authorizes the second set of participants to view the particular content, CPU 104 modifies sharing credentials (e.g., sharing credentials 216*b*) of the corresponding receiving participant (e.g., receiving participant 202*b*) and/or modifies at least one sharing parameter (e.g., sharing parameter 210*b*) associated with the content (content 208*b*) to enable viewing access to the content for the second set of participants during the video conference. The modification of the sharing credentials and/or sharing parameter can be permanent, in one implementation, or temporary, in another implementation. The timing of the temporary access may be a single access during the period of the present video conference or a time-based temporary access during a set timeframe (e.g., 4 hours) for allowing the otherwise restricted participant to access the content. In another alternate embodiment, in response to determining the received response authorizes the second set of participants to view the particular content, CPU 104 may be triggered to override the viewing access restrictions and grant only temporary access to the content (second content 208*b*) and does not modify sharing credentials of the second group of participants or sharing parameters of the content. FIG. 4 illustrates an example authorization notification 220 which enables a user of DPS 100 to authorize access to view second content 208*b*.

In another embodiment, certain types of subject matter may be identified as content/data types that are not to be shared (i.e., restricted content) during the video conference (e.g., pay grade information). Prior to initiating the video conference, CPU 104 may determine, based on the classification of each content 208*a-n*, whether any of content 208*a-n* contains any subject matter that is not to be shared during the video conference. In response to determining the content contains subject matter that matches the at least one restricted type, CPU 104 may issue alert 226 on an output device (e.g., output device 134) of DPS 100 that requests that the content that is not to be shared be first closed prior to initiation of the video conference, according to a first embodiment. In another embodiment, alert 226 includes an option to allow for a sharing participant to authorize content 208 that conflicts with the types of subject matter that are not to be shared during the video conference.

Figure 5:
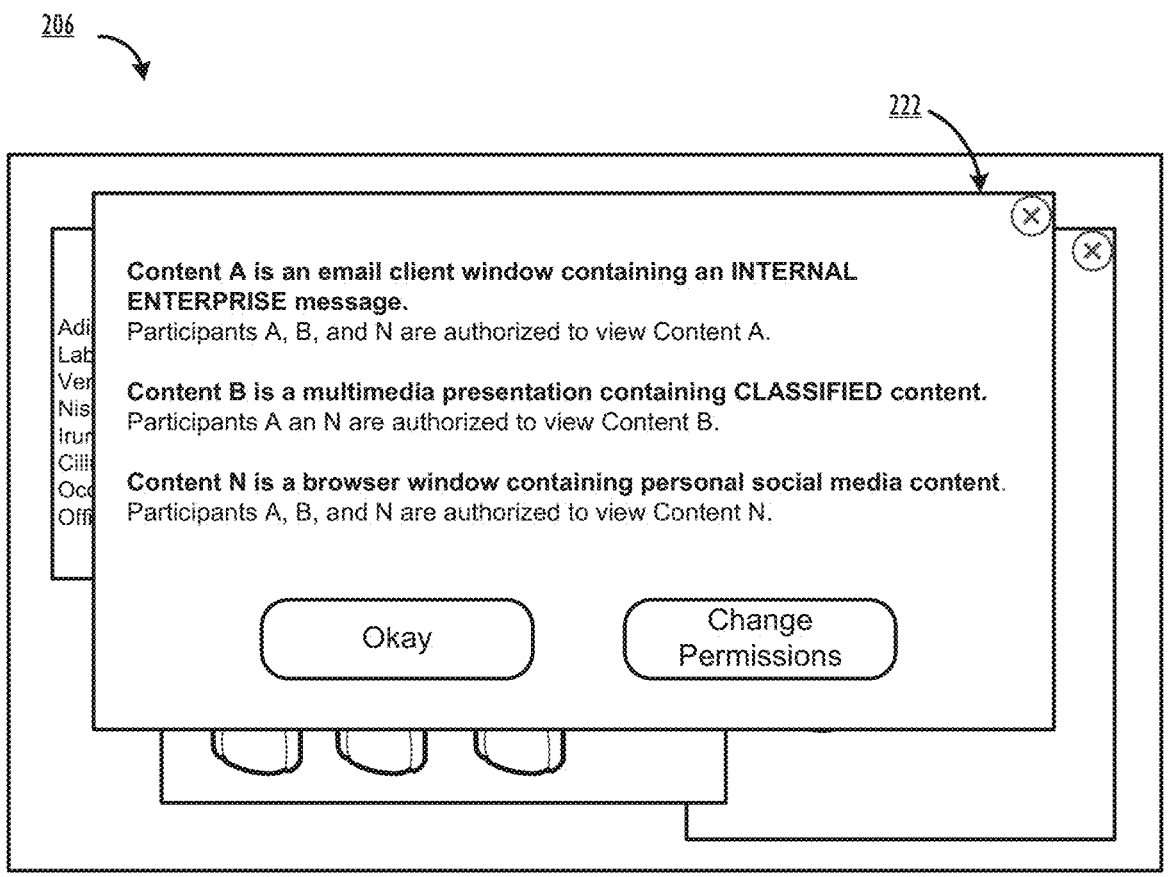
FIG. 5 illustrates an example initiation notification, in accordance with one or more embodiments.

In another embodiment, CPU 104 issues, to the sharing participant, initiation notification 222, which describes content 208*a-n* that is to be shared during the video conference with each of participants 202*a-n* and includes an option to allow for the sharing participant to granularly authorize and/or deauthorize select participants to view select content 208*a-n* and/or prevent select participants from viewing select content 208*a-n* in the video conference. In at least one embodiment, initiation notification 222 includes a brief description of a classification of each content 208*a-n* that is to be shared during the video conference. In response to determining the received response authorizing or deauthorizing receiving participants view of specific content, CPU 104 modifies sharing credentials of the corresponding receiving participant(s) and/or modifies at least one sharing parameter associated with the content to enable and/or prohibit viewing access to the specific content for those receiving participant(s) for the video conference. The modification of the sharing credentials of the corresponding receiving participant(s) and/or the at least one sharing parameter associated with the content also enables and/or prohibits viewing access to the specific content for those receiving participant(s) for future video conferences. In at least one embodiment, initiation notification 222 is displayed prior to initiating the video conference. In another embodiment, initiation notification 222 is displayed at the start of the video conference. In one or more embodiments, initiation notification 222 is obfuscated for at least one of receiving participants 202*a-n*. FIG. 5 illustrates an example initiation notification 222 which enables a user of DPS 100 to read a brief description of a classification of each content to be shared and enable the user to approve sharing of content 208*a-n* during the video conference or prevent select participants from viewing select content 208*a-n* in the current video conference.

Figure 6:
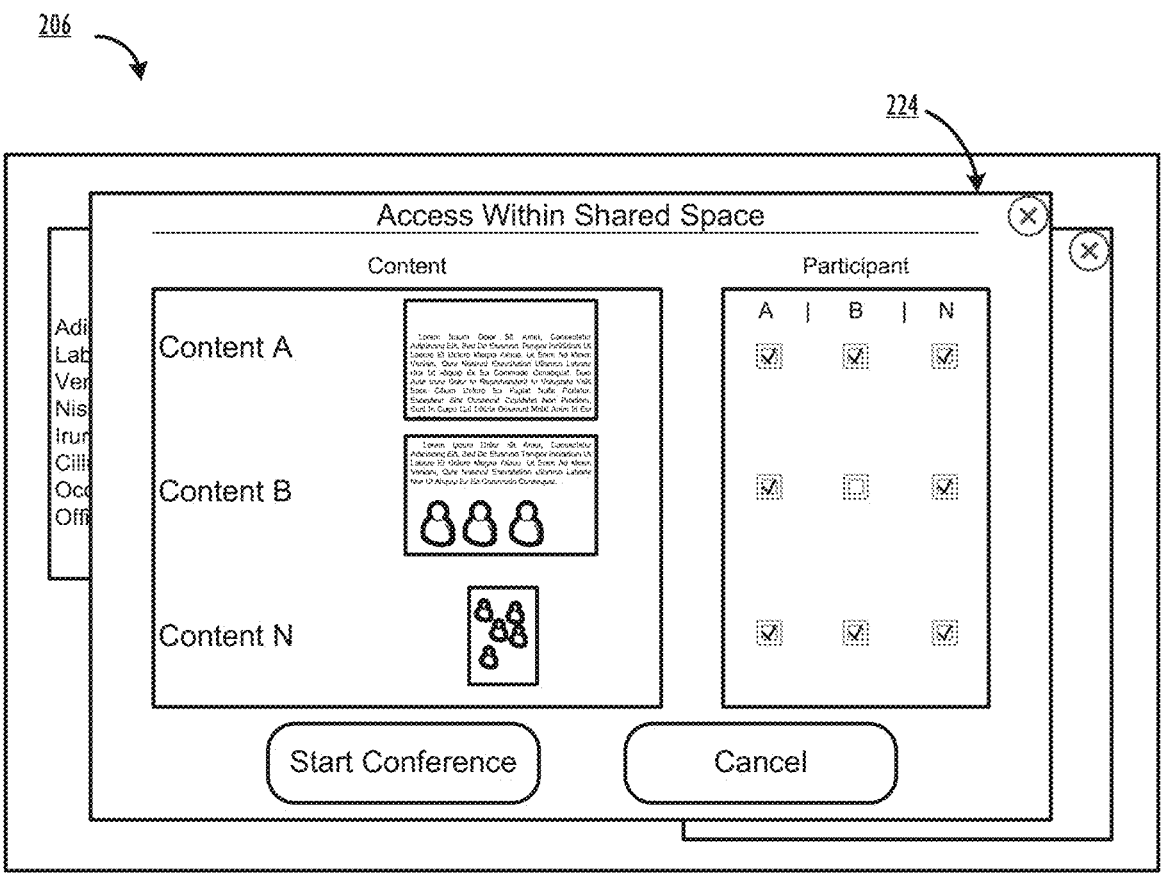
FIG. 6 illustrates an example content notification, in accordance with one or more embodiments.

In another embodiment, CPU 104 receives, via at least one input device (e.g., input devices 132), a selection that identifies at least one receiving participant (e.g., receiving participants 202*a-n*) as participants in the video conference. In response to receiving the selection, CPU 104 compares the sharing parameters 210*a-n* for each content 208*a-n* to the sharing credentials 216*a-n* for each receiving participant 202*a-n*, as described above, and CPU 104 generates content notification 224, which is displayed on an output device (e.g., monitor or touchscreen display) of DPS 100. Content notification 224 includes: an identification of a classification of each content 208*a-n* to be shared; an identification of which receiving participants 202*a-n* are able to view the content 208*a-n* during the video conference; and requests for approval to share content 208*a-n* with the receiving participants 202*a-n*. In another embodiment, content notification 224 also includes an identification of which receiving participants 202*a-n* are not able to view the content 208*a-n* during the video conference. Content notification 224 also includes options that allow the sharing participant to authorize and/or deauthorize select receiving participants 202*a-n* and includes options that allow the sharing participant to initiate the video conference with the receiving participants 202*a* and/or cancel the video conference. In at least one embodiment, the video conference is not initiated until a response to content notification 224 is received that approves initiation of the video conference. FIG. 6 illustrates an example content notification 224 which enables a user of DPS 100 to toggle or clear checkboxes in order to authorize sharing of select content 208*a-n* with individual receiving participants 202*a-n* during the video conference or deauthorize sharing of select content 208*a-n* with individual receiving participants 202*a-n* during the video conference. As illustrated, content notification 224 may also include a thumbnail display of each individual content that is to be shared during the video conference.

It should be noted that while the features and functionality described in FIG. 2 are performed by DPS 100, in another embodiment, transaction service 204 also includes a processor for executing portions of CSU 117. For example, transaction service 204 may function as an intermediary device that receives content 208*a-n* and/or sharing space 206 from DPS 100 and contextually shares content 208*a-n* with receiving participants 202*a-n*. Transaction service 204 may also generate and provide authorization notification 220, initiation notification 222, content notification 224, and/or alert 226 to the sharing participant (DPS 100).

Figure 7:
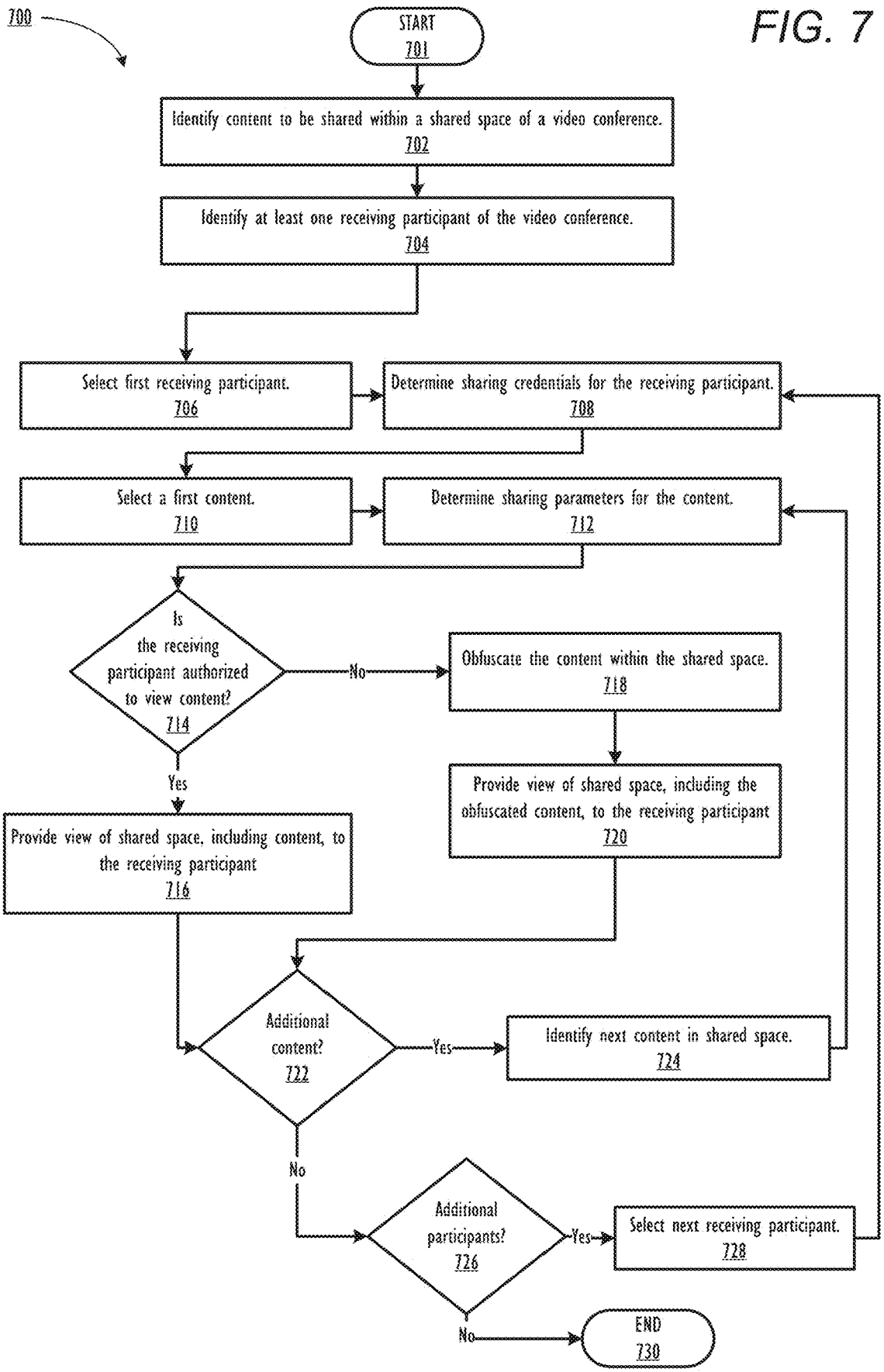
FIG. 7 is a flow chart illustrating a method for contextually sharing content within a video conference, in accordance with one or more embodiments.

Referring now to FIG. 7, there is depicted a high-level flow-chart illustrating a method for contextually sharing content with at least one receiving participant during a video conference, in accordance with one or more embodiments of the present disclosure. Aspects of the method are described with reference to the components of FIGS. 1 and 2. Several of the processes of the method provided in FIG. 7 can be implemented by a processor (e.g., CPU 104) executing software code of CSU 117 within a data processing system (e.g., DPS 100). In another embodiment, several of the processes of the method provided in FIG. 7 can be implemented by a processor executing software code of CSU 117 within a transaction service (e.g., transaction service 204). The method processes described in FIG. 7 are generally described as being performed by components of DPS 100.

Method 700 commences at initiator block 701 then proceeds to block 702. At block 702, CPU 104 identifies at least one content (e.g., content 208*a-n*) to be shared within a shared space (e.g., shared space 206) of a video conference. At block 704, DPS 100 identifies at least one receiving participant that is to participate in the video conference. At block 706, CPU 104 selects a first receiving participant (e.g., receiving participant 202*a*) from among the at least one receiving participant. At block 708, CPU 104 determines sharing credentials (e.g., sharing credentials 216*a*) for the receiving participant. At block 710, CPU 104 selects a first content (e.g., content 208*a*) from among the at least one content that is to be shared with the receiving participant within shared space 206 during the video conference. At block 712, CPU 104 determines sharing parameters 210*a-n* for content. At block 714, CPU 104 determines, based on sharing credentials of the receiving participant and the sharing parameters of the content, whether the receiving participant is authorized to view the content.

In response to determining that the receiving participant is not authorized to view the content, CPU 104 obfuscates the content within shared space 206 (block 718). At block 720, CPU 104 provides, to the receiving participant, an obfuscated view of the content within the shared space. Method 700 then proceeds to block 722. In response to determining that the receiving participant is authorized to view the content, CPU 104 provides, to the receiving participant, a view of the content within the shared space (block 716). Method 700 then proceeds to block 722.

At block 722, CPU 104 determines whether there exists additional content to be shared with the receiving participant within the shared space. In response to determining additional content exists to be shared with the receiving participant within the shared space, CPU 104 identifies a next content (e.g., content 208*b*) from among the at least one content to be shared with the receiving participant within the shared space (block 724). Method 700 then proceeds back to block 712 and CPU 104 determines sharing parameters (e.g., sharing parameters 210*b*) for the next content.

In response to determining no additional content exists to be shared with the receiving participant within the shared space, CPU 104 determines whether there is at least one additional receiving participant from among receiving participants 202*a-n* to participate in the video conference (block 726). In response to determining there are additional receiving participants of the video conference, CPU 104 identifies a next receiving participant (e.g., receiving participant 202*b* from among receiving participants 202*a-n* (block 728). Method 700 then proceeds back to block 708 and CPU 104 determines sharing credentials (e.g., sharing credentials 216*b*) for the next receiving participant. In response to determining there are no additional receiving participants of the video conference, method 700 terminates at block 730. It should be noted that in one or more embodiments, the processes described in FIG. 7 may completed contemporaneously by CPU 104 for all content and all participants. Thus, the shared space for each receiving participant of the video conference is provided to each receiving participant at substantially the same time.

Figure 8:
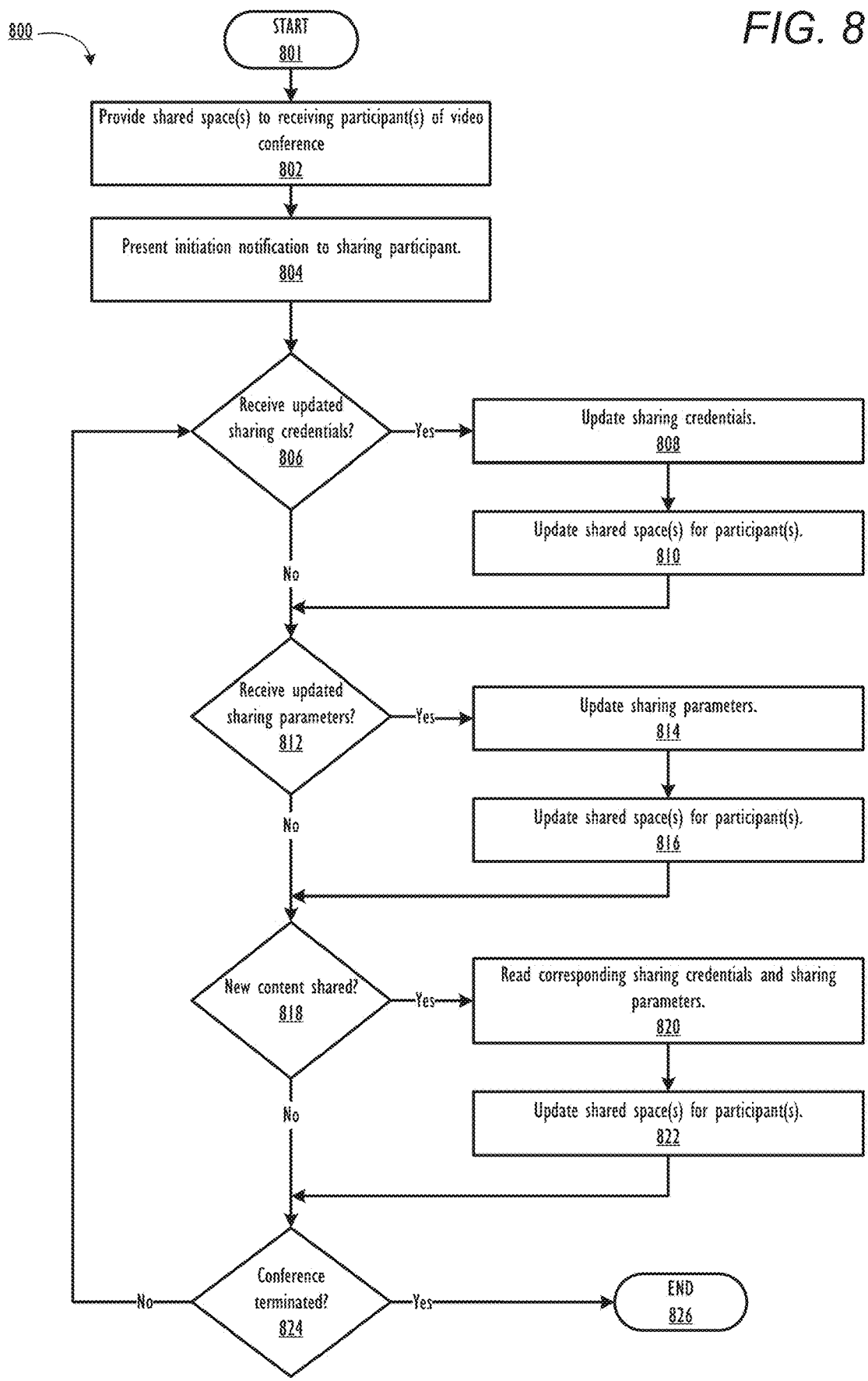
FIG. 8 is a flow chart illustrating a method for updating shared content during a video conference, in accordance with one or more embodiments.

Referring now to FIG. 8, there is depicted a high-level flow-chart illustrating a method for updating shared content during a video conference, in accordance with one or more embodiments of the present disclosure. Aspects of the method are described with reference to the components of FIGS. 1 and 2. Several of the processes of the method provided in FIG. 8 can be implemented by a processor (e.g., CPU 104) executing software code of CSU 117 within a data processing system (e.g., DPS 100). In another embodiment, several of the processes of the method provided in FIG. 8 can be implemented by a processor executing software code of CSU 117 within a transaction service (e.g., transaction service 204). The method processes described in FIG. 8 are generally described as being performed by components of DPS 100.

Method 800 commences at initiator block 801 then proceeds to block 802. At block 802, CPU 104 initiates the video conferences with the receiving participants 202*a-n* by providing shared spaces (e.g., shared spaces 218*a-n*) having content (e.g., content 208*a-n*) to receiving participants 202*a-n*. As described above, a shared space 218 of a particular receiving participant 202 may include non-obfuscated content (e.g., content 208*a* and content 208*n*) and/or obfuscated content (e.g., content 208*b*'), based on the sharing parameters of the particular content and/or sharing credentials of the receiving participant. At block 804, CPU 104 generates and presents an initiation notification (e.g., initiation notification 222) on an output device (e.g., monitor or touch-screen display) of DPS 100.

At block 806, CPU 104 determines whether updated sharing credentials have been received for at least one receiving participant of the video conference. It should be noted that updated sharing credentials may be received from a corresponding receiving participant and/or transaction service, downloaded from a server, and/or entered by a user of DPS 100 by an input device. In response to determining updated sharing credentials have not been received for at least one receiving participant, method 800 proceeds to block 812. In response to determining updated sharing credentials have been received for at least one receiving participant, CPU 104 updates the sharing credentials for the at least one receiving participant within system memory 110 (block 808). At block 810, CPU 104 updates the shared spaces for the receiving participants in the video conference based on the updated sharing credentials. The updated shared spaces may authorize or deauthorized specific content within the shared spaces. Method 800 then proceeds to block 812.

At block 812, CPU 104 determines whether updated sharing parameters have been received for content shared in the video conference. It should be noted that in at least one embodiment, updated sharing parameters may be entered by a user of DPS 100 via an input device. In response to determining updated sharing parameters have not been received for at least one content, method 800 proceeds to block 818. In response to determining updated sharing parameters have been received for at least one content, CPU 104 updates the sharing parameters for the at least one content (block 814). At block 816, CPU 104 updates the shared spaces for the receiving participants in the video conference based on the updated sharing parameters. The updated shared spaces may authorize or deauthorized specific content within the shared spaces. Method 800 then proceeds to block 818.

At block 818, CPU 104 determines whether a request to share new/additional content in the video conference has been received. In response to determining no new/additional content is to be shared in the video conference, method 800 proceeds to block 824. In response to determining new/additional content is to be shared in the video conference, CPU 104 updates the sharing credentials and sharing parameters for the new/additional content within system memory 110 (block 820). At block 822, CPU 104 updates the shared spaces for the receiving participants in the video conference based on the new/additional content. The updated shared spaces may include, for each receiving participant, additional content that the receiving participant is authorized to view and/or may obfuscate other content for which the receiving participant is not authorized to view. Method 800 then proceeds to block 824.

At block 824, CPU 104 determines whether the video conference has been terminated. In response to determining the video conference has not been terminated, method 800 proceeds back to block 806. In response to determining the video conference has been terminated, method 800 terminates at block 826.

In the above-described flow charts of FIGS. 7-8, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
identifying content to be shared by a sharing participant within a shared space of a video conference, the shared space being viewable by the at least one receiving participant, the shared space being a viewable area of content that is generally viewable by receiving participants during the video conference unless obscured based on at least one or a combination of a sharing credential of a receiving participant and a sharing parameter of the content, the at least one receiving participant being connected to the video conference;
determining at least one sharing parameter associated with the content that defines participant access to view the content;
determining sharing credentials for each receiving participant of the video conference;
comparing the at least one sharing parameter to the sharing credentials of each receiving participant to individually determine which receiving participant is authorized to view the content; and
in response to the comparison indicating that a receiving participant is not authorized to view at least a portion of the content, obfuscating the portion of the content presented within a customized view of the shared space for the unauthorized participant.

2. The method of claim 1, further comprising:
in response to the comparison indicating that a receiving participant is not authorized to view the content, providing a view of the shared space, including the obfuscated content, to the unauthorized participant whenever the content is being shared within the shared space; and
in response to the comparison indicating that the receiving participant is not authorized to view at least one first portion of the content but is authorized to view at least one second portion of the content:
obfuscating, from a view of the partially-authorized participant, the at least one first portion of the content within the shared space; and
providing, to the partially-authorized participant, a view of the shared space with the at least one first portion obfuscated and the at least one second portion visible.

3. The method of claim 1, further comprising:
in response to the comparison identifying, from among the at least one receiving participant, a first set of participants that is authorized to view the content and a second set of participants that is not authorized to view the content, issuing, to the sharing participant, a notification that includes an option to allow for approval to authorize the second set of participants to view the content;
receiving a response to the notification; and
in response to determining the received response authorizes the second set of participants to view the content, modifying at least one of the sharing credentials and the at least one sharing parameter to enable viewing access to the content for the second set of participants during the video conference.

4. The method of claim 1, further comprising:
issuing, to the sharing participant, a notification that describes the content shared during the conference to each receiving participant;
receiving a reply to the notification that identifies at least one particular receiving participant that should not be authorized to view the content in future video conferences; and
modifying at least one of the sharing credentials and the at least one sharing parameter to restrict viewing access of the at least one particular receiving participant to the content for future video conferences.

5. The method of claim 1, further comprising:
receiving, by at least one input device, a selection that identifies the at least one receiving participant as participants in the video conference;
in response to comparing the at least one sharing parameter to the sharing credentials, presenting a notification to the sharing participant that identifies a classification the content, identifies each participant that is able to view the content during the video conference, and requests approval to share the content with the at least one receiving participant; and
in response to receiving, from the sharing participant, a reply to the notification that approves sharing of the content, initiating the video conference with the at least one receiving participant, wherein the video conference is not initiated until approval is received from the sharing participant.

6. The method of claim 1, further comprising:
determining a predetermined classification associated with the content;
determining at least one type of subject matter that is not to be shared during the video conference;
determining, based on the classification, whether the content contains subject matter that matches the at least one type of subject matter; and
in response to determining the content contains subject matter that matches the at least one type, issuing an alert that requests the content be closed prior to initiation of the video conference.

7. The method of claim 1, wherein the at least one sharing parameter is associated with at least one of:
an identity of the sharing participant;
a source of the content;
an event listing corresponding to the video conference;
an organizational policy; and
an organizational affiliation of the sharing participant.

8. The method of claim 1, wherein the sharing credentials of a participant include at least one of:
an organizational affiliation of the receiving participant;
a hierarchical access level associated with the receiving participant; and
information access permissions associated with the receiving participant.

9. A data processing system comprising:
at least one input device that receives, from a sharing participant, an input requesting initiation of a video conference with at least one receiving participant;
a storage that includes content that is to be shared by a sharing participant within a shared space of the video conference, the shared space being viewable by the at least one receiving participant, the shared space being a viewable area of content that is generally viewable by receiving participants during the video conference unless obscured based on at least one or a combination of a sharing credential of a receiving participant and a sharing parameter of the content, the at least one receiving participant being connected to the video conference;

a processor that executes program code for selectively obscuring information in a video conference, the program code enabling the processor to:
  determines at least one sharing parameter that defines participant access to view the content;
  determines sharing credentials for each receiving participant of the video conference;
  compares the at least one sharing parameter to the sharing credentials of each receiving participant to individually determine whether which receiving participant is authorized to view the content;
  in response to the comparison indicating that a receiving participant is not authorized to view at least a portion of the content, obfuscates the portion of the content presented within a customized view of the shared space for the unauthorized participant; and
at least one output device that provides, to at least one receiving device associated with the at least one receiving participant, video stream output that includes a view of the shared space, including the obfuscated content, to the participant for the duration of the video conference.

10. The data processing system of claim 9, wherein:
in response to determining, based on the comparison, that the receiving participant is not authorized to view at least one first portion of the content but is authorized to view at least one second portion of the content:
  the processor obfuscates within the view associated with the partially-authorized participant the at least one first portion of the content within the shared space; and
  that at least one output device provides to the at least one receiving device the view of the shared space with the at least one first portion obfuscated and the at least one second portion visible.

11. The data processing system of claim 9, wherein:
the processor, in response to the comparison identifying, from among the at least one receiving participant, a first set of participants that is authorized to view the content and a second set of participants that is not authorized to view the content, issues, to an output device, a notification that includes an option to allow the sharing participant to approve authorization of the second set of participants to view the content;
the at least one input device receives a response to the notification; and
the processor, in response to determining the received response authorizes the second set of participants to view the content, modifies at least one of the sharing credentials and the at least one sharing parameter to enable, viewing access to the content for the second set of participants during the video conference.

12. The data processing system of claim 9, wherein:
the processor generates a notification that describes a substance of the content;
an output device displays the notification for viewing by the sharing participant;
the at least one input device receives a reply to the notification that identifies at least one particular receiving participant that should not be authorized to view the content in future video conferences; and
the processor modifies at least one of the sharing credentials and the at least one sharing parameter to restrict viewing access of the at least one particular receiving participant to the content for future video conferences.

13. The data processing system of claim 9, wherein:
the at least one input device receives a selection that identifies the at least one receiving participant as participants in the video conference;
the processor, in response to comparing the at least one sharing parameter to the sharing credentials, generates a notification that identifies a classification the content, identifies each participant that is able to view the content during the video conference, and requests approval to share the content with the at least one receiving participant;
an output device displays the notification for viewing by the sharing participant; and
the at least one input device receives, from the sharing participant, a reply to the notification that approves sharing of the content; and
the at least one output device, in response to receiving the reply, transmits a notice to the at least one receiving participant that initiates the video conference.

14. The data processing system of claim 9, wherein:
the processor:
  determines a predetermined classification associated with the content;
  determines at least one type of subject matter that is not to be shared during the video conference;
  determines, based on the classification, whether the content contains subject matter that matches the at least one type of subject matter; and
the at least one output device, in response to determining the content contains subject matter that matches the at least one type, issues an alert that requests the content be closed prior to initiation of the video conference.

15. The data processing system of claim 9, wherein the at least one sharing parameter is associated with at least one of:
an identity of the sharing participant;
a source of the content;
an event listing corresponding to the video conference;
an organizational policy; and
an organizational affiliation of the sharing participant.

16. The data processing system of claim 9, wherein the sharing credentials of a participant include at least one of:
an organizational affiliation of the receiving participant;
a hierarchical access level associated with the receiving participant; and
information access permissions associated with the receiving participant.

17. A computer program product comprising:
a computer readable storage device; and
program code on the computer readable storage device that, when executed by a processor associated with a data processing system, enables the data processing system to provide the functionality of:
  identifying content to be shared by a sharing participant within a shared space of a video conference, the shared space being viewable by the at least one receiving participant, the shared space being a viewable area of content that is generally viewable by receiving participants during the video conference unless obscured based on at least one or a combination of a sharing credential of a receiving participant and a sharing parameter of the content, the at least one receiving participant being connected to the video conference;
  determining at least one sharing parameter that defines participant access to view the content;

determining sharing credentials for each receiving participant of the video conference;

comparing the at least one sharing parameter to the sharing credentials of each receiving participant to individually determine which receiving participant is authorized to view the content; and in response to the comparison indicating that a receiving participant is not authorized to view at least a portion of the content, obfuscating the portion of the content presented within a customized view of the shared space for the unauthorized participant.

18. The computer program product of claim 17, the program code further comprising code for:

in response to the comparison indicating that a receiving participant is not authorized to view the content, providing a view of the shared space, including the obfuscated content, to the unauthorized participant whenever the content is being shared within the shared space; and in response to the comparison indicating that the receiving participant is not authorized to view at least one first portion of the content but is authorized to view at least one second portion of the content:

obfuscating, from a view of the partially-authorized participant, the at least one first portion of the content within the shared space; and providing, to the partially-authorized participant, a view of the shared space with the at least one first portion obfuscated and the at least one second portion visible.

* * * * *